(12) United States Patent
Andersen et al.

(10) Patent No.: US 7,151,979 B2
(45) Date of Patent: Dec. 19, 2006

(54) SYSTEM AND METHOD FOR TRACKING INVENTORY

(75) Inventors: Scott Paul Andersen, Loveland, OH (US); Richard Ferris Kirkham, Loveland, OH (US)

(73) Assignee: International Paper Company, Memphis, TN (US)

( * ) Notice: Subject to any disclaimer, the term of this patent is extended or adjusted under 35 U.S.C. 154(b) by 272 days.

(21) Appl. No.: 10/305,525

(22) Filed: Nov. 26, 2002

(65) Prior Publication Data

US 2004/0102869 A1    May 27, 2004

(51) Int. Cl.
*G06F 7/00* (2006.01)

(52) U.S. Cl. ................. 700/214; 700/225; 701/201

(58) Field of Classification Search ......... 700/213, 700/214, 225; 340/825.06, 988; 342/357.01, 342/357.06; 701/23, 24, 26, 201, 213, 209, 701/210
See application file for complete search history.

(56) References Cited

U.S. PATENT DOCUMENTS

| | | | |
|---|---|---|---|
| 3,169,242 A | 2/1965 | Davis et al. ................. 343/6.5 |
| 3,568,161 A | 3/1971 | Knickel .................... 340/172.5 |
| 3,707,711 A | 12/1972 | Cole et al. .................. 340/280 |
| 3,720,940 A | 3/1973 | Fox et al. .................... 343/6 R |
| 3,780,368 A | 12/1973 | Northeved et al. .......... 343/6.5 |
| 3,952,304 A | 4/1976 | Broniwitz et al. ....... 343/16 M |
| 4,063,229 A | 12/1977 | Welsh et al. ................ 340/280 |
| 4,068,232 A | 1/1978 | Meyers et al. |
| 4,533,167 A * | 8/1985 | Johnson .................... 294/86.4 |
| 4,656,463 A | 4/1987 | Anders et al. ............... 340/572 |
| 4,673,932 A | 6/1987 | Ekchian et al. ........ 340/825.54 |
| 4,725,186 A * | 2/1988 | Jerue .......................... 414/627 |
| 4,827,395 A | 5/1989 | Anders et al. ............... 364/138 |
| 4,888,593 A | 12/1989 | Friedman et al. ........... 342/387 |
| 5,113,349 A * | 5/1992 | Nakamura et al. .......... 700/215 |
| 5,134,277 A | 7/1992 | Yerbury et al. ....... 250/214 RC |
| 5,235,326 A | 8/1993 | Beigel et al. .......... 340/825.54 |
| 5,252,962 A | 10/1993 | Urbas et al. |
| 5,254,997 A | 10/1993 | Cohn .......................... 342/44 |
| 5,260,694 A * | 11/1993 | Remahl ...................... 340/674 |
| 5,260,711 A | 11/1993 | Sterzer ....................... 342/375 |
| 5,261,800 A | 11/1993 | Sakae |
| 5,289,372 A | 2/1994 | Guthrie et al. .............. 364/403 |
| 5,292,219 A * | 3/1994 | Merin et al. ................. 414/621 |
| 5,387,916 A | 2/1995 | Cohn .......................... 342/44 |
| 5,406,263 A | 4/1995 | Tuttle ......................... 340/572 |
| 5,422,636 A | 6/1995 | Urbas et al. ........... 340/825.54 |
| 5,434,775 A | 7/1995 | Sims et al. .................. 364/403 |
| 5,451,939 A | 9/1995 | Price ..................... 340/870.31 |
| 5,461,385 A | 10/1995 | Armstrong ................... 342/42 |
| 5,481,245 A | 1/1996 | Moldavsky ................. 340/540 |

(Continued)

FOREIGN PATENT DOCUMENTS

EP          0824245 A1      7/1997

(Continued)

*Primary Examiner*—Khoi H. Tran
(74) *Attorney, Agent, or Firm*—Matthew M. Eslami

(57) ABSTRACT

An RFID enabled paper roll includes a tubular core, a paper stock wound around the core, and a radio frequency integrated circuit electrically coupled to an antenna and positioned on the core. A system for reading a radio frequency integrated circuit positioned on an item of inventory in a warehouse comprises a material handling device and an RFID reader coupled to the material handling device. The material handling device has at least member for use in transporting an item of inventory. The reader is configured to read the radio frequency integrated circuit associated with the item of inventory when the item is in proximity to the material handling device.

1 Claim, 7 Drawing Sheets

U.S. PATENT DOCUMENTS

| | | | |
|---|---|---|---|
| 5,528,232 A | 6/1996 | Verma et al. | |
| 5,548,106 A | 8/1996 | Liang et al. | 235/454 |
| 5,594,448 A | 1/1997 | d'Hont | 342/44 |
| 5,627,517 A | 5/1997 | Theimer et al. | 340/572 |
| 5,646,592 A | 7/1997 | Tuttle | 340/572 |
| 5,686,902 A | 11/1997 | Reis et al. | |
| 5,760,742 A | 6/1998 | Branch et al. | 342/457 |
| 5,774,876 A | 6/1998 | Woolley et al. | 705/28 |
| 5,791,801 A | 8/1998 | Miller | |
| 5,791,861 A * | 8/1998 | Seelig | 414/627 |
| 5,798,693 A | 8/1998 | Engellenner | 340/505 |
| 5,798,694 A | 8/1998 | Reber et al. | 340/540 |
| 5,821,859 A | 10/1998 | Schrott et al. | 340/572 |
| 5,831,531 A | 11/1998 | Tuttle | 340/572 |
| 5,850,187 A | 12/1998 | Carrender et al. | 340/825.54 |
| 5,887,176 A | 3/1999 | Griffith et al. | 395/750 |
| 5,908,135 A | 6/1999 | Bradford et al. | 220/673 |
| 5,936,523 A | 8/1999 | West | 340/545.6 |
| 5,963,134 A | 10/1999 | Bowers et al. | |
| 5,971,587 A | 10/1999 | Kato et al. | 364/468.22 |
| 5,973,599 A | 10/1999 | Nicholson et al. | 340/572.8 |
| 5,992,739 A | 11/1999 | Maeder | |
| 5,997,064 A * | 12/1999 | Orita | 294/119.1 |
| 6,025,780 A | 2/2000 | Bowers et al. | 340/572.3 |
| 6,027,027 A | 2/2000 | Smithgall | 235/488 |
| 6,027,302 A | 2/2000 | Nilsson | |
| 6,031,503 A | 2/2000 | Preiss, II et al. | 343/770 |
| 6,054,935 A | 4/2000 | Urbas et al. | 340/870.17 |
| 6,057,756 A | 5/2000 | Engellenner | 340/505 |
| 6,091,332 A | 7/2000 | Eberhardt et al. | 340/572.1 |
| 6,130,613 A | 10/2000 | Eberhardt et al. | 340/572.7 |
| 6,148,291 A | 11/2000 | Radican | 705/28 |
| 6,150,921 A | 11/2000 | Werb et al. | |
| 6,201,499 B1 | 3/2001 | Hawkes et al. | 342/387 |
| 6,206,292 B1 | 3/2001 | Robertz et al. | 235/488 |
| 6,208,910 B1 * | 3/2001 | Michael et al. | 700/225 |
| 6,232,877 B1 | 5/2001 | Ashwin | 340/572.1 |
| 6,237,051 B1 | 5/2001 | Collins | |
| 6,246,327 B1 | 6/2001 | Eberhardt | 340/572.1 |
| 6,255,962 B1 | 7/2001 | Tanenhaus et al. | 340/870.05 |
| 6,259,369 B1 | 7/2001 | Monico | 340/572.8 |
| 6,272,457 B1 | 8/2001 | Ford et al. | 704/9 |
| 6,285,282 B1 | 9/2001 | Dorenbosch et al. | 340/540 |
| 6,332,098 B1 * | 12/2001 | Ross et al. | 700/226 |
| 6,353,406 B1 | 3/2002 | Lanzl et al. | |
| 6,373,389 B1 | 4/2002 | Przygoda, Jr. et al. | |
| 6,388,569 B1 | 5/2002 | Engellenner | 340/505 |
| 6,396,438 B1 | 5/2002 | Seal | 342/127 |
| 6,488,212 B1 | 12/2002 | Maeder | |
| 6,496,806 B1 | 12/2002 | Horwitz et al. | |
| 6,542,114 B1 * | 4/2003 | Eagleson et al. | 342/357.07 |
| 6,600,418 B1 * | 7/2003 | Francis et al. | 340/572.1 |
| 6,669,089 B1 * | 12/2003 | Cybulski et al. | 235/385 |
| 6,717,517 B1 | 4/2004 | Przygoda, Jr. | |
| 6,747,560 B1 | 6/2004 | Stevens, III | |
| 6,817,522 B1 | 11/2004 | Brignone et al. | |
| 6,819,243 B1 * | 11/2004 | Keskilammi et al. | 340/572.1 |
| 6,901,304 B1 | 5/2005 | Swan et al. | |
| 2001/0004236 A1 | 6/2001 | Letkomiller et al. | 340/572.1 |
| 2001/0035815 A1 | 11/2001 | Fletcher et al. | 340/10.6 |
| 2001/0039489 A1 | 11/2001 | Ford et al. | 704/1 |
| 2001/0053970 A1 | 12/2001 | Ford et al. | 704/9 |
| 2002/0008621 A1 | 1/2002 | Barritz et al. | 340/572.1 |
| 2002/0016829 A1 | 2/2002 | Defosse | 709/217 |
| 2002/0035524 A1 | 3/2002 | Husslage | 705/28 |
| 2002/0038267 A1 | 3/2002 | Can et al. | 705/28 |
| 2002/0044096 A1 | 4/2002 | Chung | 343/742 |
| 2002/0057208 A1 | 5/2002 | Lin et al. | 340/825.49 |
| 2002/0067267 A1 | 6/2002 | Kirkham | 340/572.7 |
| 2002/0070862 A1 | 6/2002 | Francis et al. | 340/572.1 |
| 2002/0089434 A1 | 7/2002 | Ghazarian | 340/988 |

FOREIGN PATENT DOCUMENTS

| | | |
|---|---|---|
| EP | 0824245 B1 | 7/1997 |
| GB | 2308947 | 7/1997 |
| GB | 2333207 | 7/1999 |
| WO | WO 99/05658 | 2/1999 |
| WO | WO 00/58752 | 10/2000 |

* cited by examiner

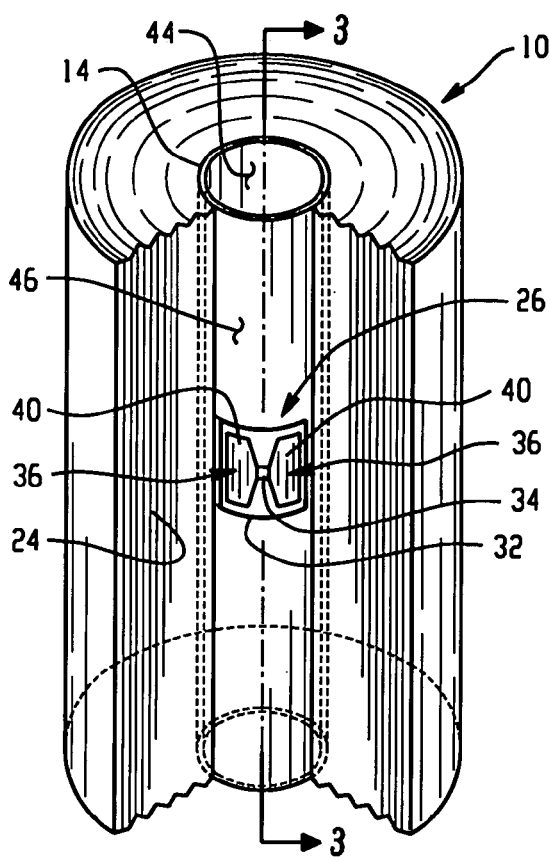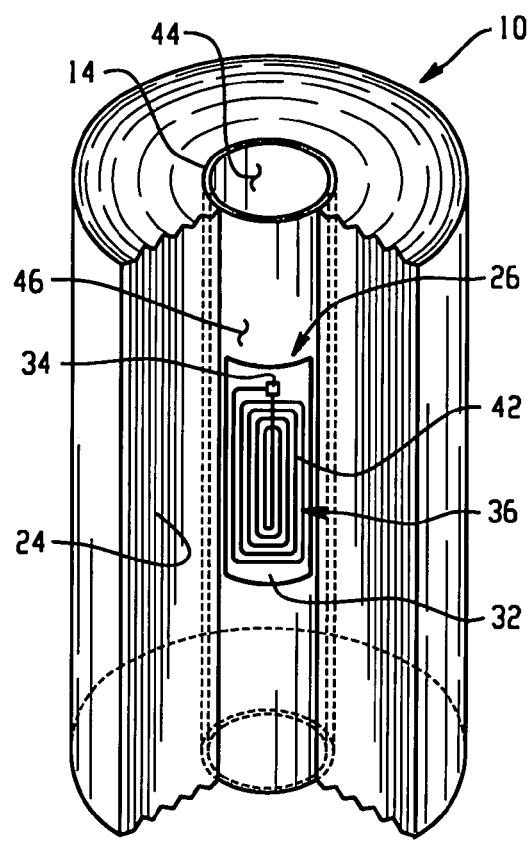
Fig. 1    Fig. 2
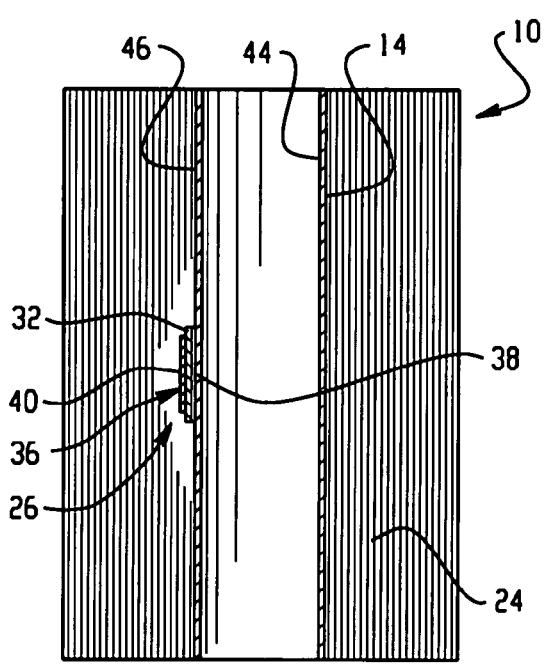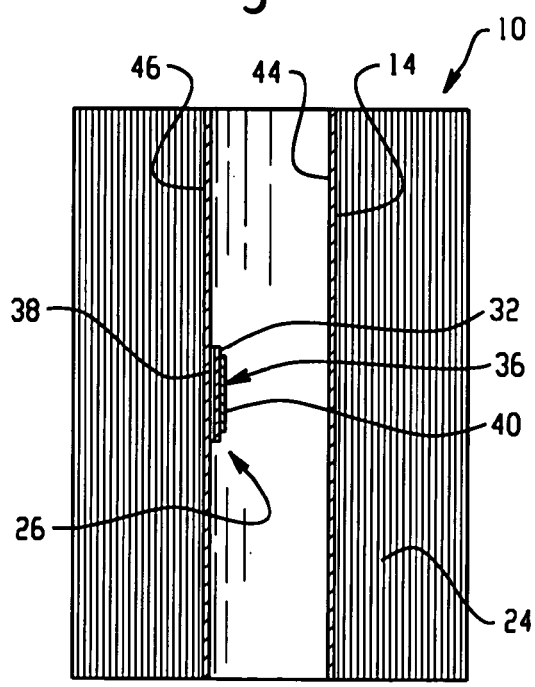
Fig. 3    Fig. 4

SYSTEM AND METHOD FOR TRACKING INVENTORY

FIELD OF THE INVENTION

The claimed invention relates to wireless communication systems. In particular, the invention relates to a paper roll that incorporates RFID components and a system for tracking inventory having RFID components in a warehouse environment.

BACKGROUND

Radio frequency identification ("RFID") technology has been used for wireless (i.e., non-contact, non-line of sight) automatic identification. An RFID system typically includes an RFID transponder, which is sometimes referred to as an inlet or tag, and an RFID reader. The transponder typically includes a radio frequency integrated circuit ("RFIC") and an antenna. Both the antenna and the RFIC can be positioned on a substrate. As used herein, the term "inlet" refers to an RFIC that is coupled to a tag. The tag includes the antenna and may also include a substrate on which the antenna is positioned.

The RFID reader utilizes an antenna and a transceiver, which includes a transmitter, a receiver, and a decoder incorporating hardware and software components. Readers can be fixed, tethered, or handheld devices, depending on the particular application. When a transponder passes through the read zone of a reader, the transponder is activated by the electromagnetic field from the reader antenna. The transceiver decodes the data sent back from the transponder and this decoded information is forwarded to a host computer for processing. Data transfer between the transponder and transceiver is wireless.

RFID systems may utilize passive, semi-passive, or active transponders. Each type of transponder may be read only or read/write capable. Passive transponders obtain operating power from the radio frequency signal of the reader that interrogates the transponder. Semi-passive and active transponders are powered by a battery, which generally results in a greater read range. Semi-passive transponders may operate on a timer and periodically transmit information to the reader. Active transponders can control their output, which allows them to activate or deactivate apparatus remotely. Active transponders can also initiate communication, whereas passive and semi-passive transponders are activated only when they are read by another device first. Multiple transponders may be located in a radio frequency field and read individually or simultaneously.

Inventory tracking in the paper industry is currently accomplished by positioning optically readable bar codes on paper rolls that are stored in warehouses. Specialty paper rolls are often produced in quantities greater than the current need and then excess quantities are stored in warehouses for later use. Paper rolls can be six feet tall by eight feet wide and are conventionally wrapped in a protective paper wrapper. Rolls may be stacked in a warehouse in rows that are, for example, 3 rolls high.

Optically readable bar codes are positioned on the exterior of the paper wrappers of the rolls. Over time, the rolls can be moved or shuffled around the warehouse. As a result, paper wrappers can be torn and the bar codes destroyed. Even where bar codes remain intact, when rolls are moved, bar codes can oftentimes become unobservable because hidden from view. As a result, paper rolls in inventory become lost in the warehouse and need to be reproduced when the customer places another order for the product. This results in great expense to the paper manufacturer. In addition, unidentifiable paper rolls remain in the warehouse taking up space and are often neither used nor destroyed. These unidentifiable rolls continue to reside in the warehouse indefinitely, taking up valuable space. A system that remedies these deficiencies is desirable.

SUMMARY

According to the claimed invention, an RFID enabled paper roll comprises a core, a paper stock wound around the core, and a radio frequency integrated circuit ("RFIC") coupled to an antenna and positioned on the core. In a preferred embodiment, the core of the paper roll is tubular and the RFIC is positioned on an RFID inlet. The RFID inlet includes an adhesive surface and the adhesive surface is positioned on one of the inner or the outer surface of the core. The RFID inlet may include a tag having a substrate, with the RFIC and antenna being positioned on the substrate.

The claimed invention also relates to a system for reading an RFIC or RFID inlet positioned on an item of inventory in a warehouse. The system comprises a material handling device and at least one RFID reader coupled to the material handling device. The material handling device has at least one member for use in transporting an item of inventory. The item of inventory has an RFIC associated therewith. The at least one reader is for reading an RFIC associated with the item of inventory when the item is in proximity to the material handling device.

In one embodiment of the system, the material handling device is a fork lift truck and the at least one member is a pair of arms extending outwardly from the fork lift truck. The at least one reader is positioned on the fork lift truck so that when the pair of arms are in proximity to the item of inventory, the at least one reader can communicate with the RFIC associated with the item of inventory. The RFIC may be positioned on an inlet and be electrically coupled to an antenna, with the inlet being positioned on the item of inventory.

In another embodiment of the system, the system further comprises a computer processor and a position locating system. The computer processor is in communication with the at least one reader for receiving information from the reader and transmitting information to the reader. The position locating system is for transmitting information to the at least one reader and the computer processor. In a preferred embodiment, the position locating system comprises a plurality of RFID transmitters and at least one RFID receiver, with the RFID receiver being positioned on the fork lift truck and the RFID transmitters being positioned at spaced locations throughout the warehouse.

The claimed invention further relates to a method of tracking an item of inventory in a warehouse. The method comprises providing the system described above, associating the pair of arms of the fork lift truck with the item of inventory, and powering the reader on the fork lift truck to communicate with the RFIC on the item of inventory to at least one of read the information stored in the RFIC and write information to the RFIC. The method may also include determining a preferred position for the item of inventory in the warehouse, transporting the item of inventory to the preferred position, depositing the item of inventory at the preferred position, determining the position of the item of inventory once the item has been deposited, and storing the deposited position of the item in at least one of the RFIC and the computer processor.

BRIEF DESCRIPTION OF THE DRAWING FIGURES

FIG. 1 is a cut-away perspective view of a paper roll showing a radio-frequency integrated circuit ("RFIC") and an antenna positioned on the core of the paper roll according to one aspect of the invention where the antenna and RFIC are electrically coupled;

FIG. 2 is a cut-away perspective view of a paper roll showing an alternative embodiment of an RFIC and an antenna positioned on the core where the antenna and RFIC are magnetically coupled;

FIG. 3 is a cross-sectional view of the paper roll of FIG. 1 taken at line 3—3, showing the antenna positioned on an exterior surface of the core;

FIG. 4 is a cross-sectional view of a paper roll similar to that of FIG. 3, but showing the antenna positioned on an inner surface of the core;

DETAILED DESCRIPTION

Figure 5:
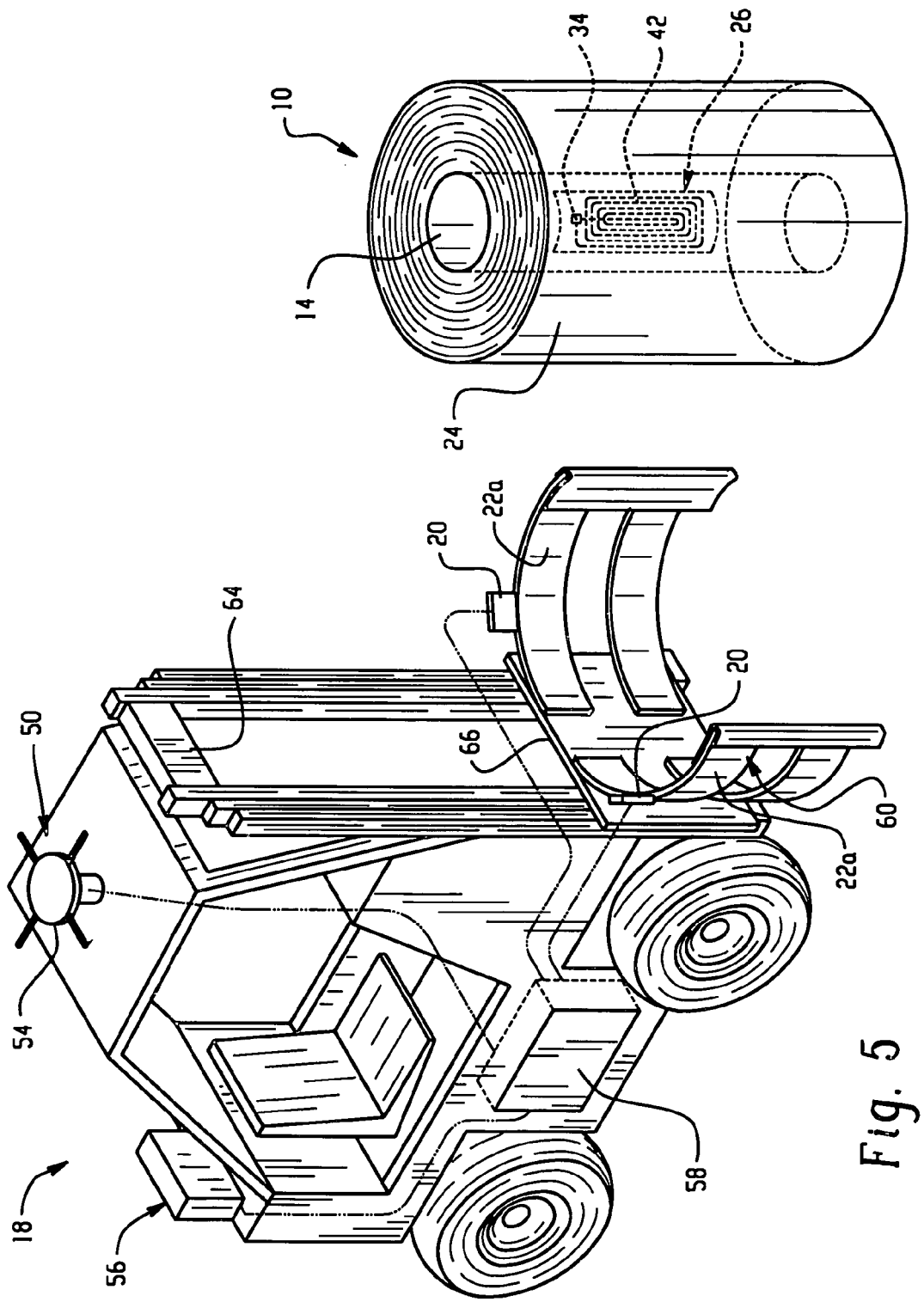
FIG. 5 is a schematic of a fork lift truck having clamp arms for engaging a roll of paper according to another aspect of the invention.

One aspect of the invention relates to a paper roll 10 that incorporates RFID components. The RFID components are for use in identifying the contents and history of the paper roll 10, as well as its location or position within a warehouse. In particular, FIGS. 1–4 show a paper roll 10 having an RFID inlet 26 installed on the core 14 of the paper roll 10. Another aspect of the invention relates to a system for reading RFID components installed on items of inventory 16, such as rolls of paper. The system, as shown in FIGS. 5–12, incorporates a material handling device in the form of a fork lift truck 18 having an RFID reader 20 and a reader antenna 60 installed on the fork lift truck 18. Another aspect of the invention relates to a method of tracking inventory 16 in a warehouse 12 using the system. Each of these aspects will be discussed in greater detail below.

Inventory 16 in a warehouse 12 is typically stacked in multiple rows and columns, several rows deep and high. Inventory may include boxes or cases of products, among other types of inventory known to those of skill in the art. One type of inventory for which the invention is particularly useful is rolls of paper. Rolls of paper in a warehouse environment may be stored up to approximately 13 rolls deep and 3 rolls high. A typical roll of paper ranges in diameter from about 2 to 8 feet, is approximately 6 to 8 feet tall, and weighs approximately 1 ton.

As shown in FIGS. 1–4, a roll of paper 10 includes a core 14 of a sturdy material, such as compressed paper fibers. The material that makes up the core layer may be ½ to 1 inch thick or more and is shaped in the form of a tube. A continuous sheet of stock 24 is wound around the core 14. The stock 24 may be any type of material. An RFID inlet 26 is positioned on the core 14. The RFID inlet 26 typically comprises a tag 32 in the form of a thin substrate having an antenna 36 positioned on the substrate, and a radio frequency integrated circuit ("RFIC") 34. The RFIC 34 and antenna 36 are electrically coupled to one another, either by direct contact or by capacitive coupling. The RFIC 34 may include semiconductor circuits having logic, memory, and RF circuitry, and may be a silicon-based chip, a polymer-based chip, or other chips that are known today or will be developed in the future.

An antenna 36 is positioned on the inlet 26 in electrical communication with the RFIC. In a preferred embodiment, the antenna 36 is positioned on the tag 32 of the inlet 26. The tag 32 may be a paper or polymeric material, such as polyester, among other known materials. A pressure sensitive adhesive 38, or other attachment medium, may be positioned on one side of the tag 32 for use in attaching the inlet 26 to the surface of the core 14. Alternatively, the inlet 26 may be applied using glues, hot melts, water activated adhesives, or other adhering mediums. The inlet 26 may be applied to the core 14 with an automatic application device, such as a label applicator, which applies the inlet 26 to the outer surface of the core 14 after it has been formed into a tube. Alternatively, the inlet 26 may be applied after the paper stock 24 has been wound around the core 14. Furthermore, the inlet 26 may be applied by hand or with an automated process. A preferred position for the inlet 26 on the core 14 is near the center of the core, although the inlet 26 may be positioned at any location along the length of the core 14.

The antenna 36 on the tag substrate 32 may be an inductive or a capacitive antenna 36 depending on the RF frequency chosen for the application. The RFID transponder 26 may be an inductive or a capacitive system. One type of capacitive antenna is shown in FIGS. 1, 3, and 4. The capacitive antenna includes two pads 40 of conductive material with a non-conductive gap positioned between the pads 40. An RFIC 34 is positioned in the gap in electrical contact with both pads 40 of the antenna. The RFIC 34 has terminals (not shown) which may directly contact the pads 40 or may be otherwise connected to the pads 40 with separate connectors. The RFIC 34 may alternatively be capacitively coupled to the antenna pads 40.

An inductive antenna in the form of a loop 42 with two ends is shown positioned on a tag 32 in FIG. 2. The RFIC 34 is in electrical contact with the ends of the loop 42. One end of the loop is electrically coupled to one of the terminals of the RFIC 34 while the other end of the loop utilizes a bridging connector to couple to the other terminal of the RFIC 34.

The inlet 26 may be positioned on an inner surface 44 of the core 14, as shown in FIG. 4, or on an outer surface 46 of the core 14, as shown in FIGS. 1–3. The inlet 26 may also be embedded within the material of the core (not shown). When the inlet 26 is positioned on the outer surface 46 of the core 14, it is positioned on the core 14 prior to the application of the stock 24 to the core 14. Alternatively, when the inlet 26 is positioned on the internal surface 44 of the core 14, it may be positioned on the core 14 either before or after the paper stock 24 is wound around the core 14. In FIGS. 3 and 4, the adhesive layer on the tag is shown attached to one side of the tag while the antenna and RFIC are positioned on the other side of the tag. Alternatively, the adhesive, antenna, and RFIC may all be positioned on the same side of the tag.

With this latter embodiment, the tag 32 is the outer most surface of the inlet 26 once the adhesive 38 is applied to the surface of the core 14, providing a degree of protection for the antenna and RFIC.

It should be noted that RFIC 34 and antenna 36 combinations other than those discussed above or shown in the figures may be utilized with the invention. For instance, the RFIC 34 may be positioned on a tag 32 for ease in attachment to a surface of the core 14, or may be directly applied to a surface of the core 14 or embedded in the core without a tag 32. Furthermore, while the antenna 36 is generally positioned on the inlet 26, the antenna 36 may be positioned on the surface of the core 14 instead of on the inlet 26. When the antenna 36 is positioned directly on the core surface, the RFIC 34, which is electrically coupled to the antenna 36, is positioned on a tag 32 or may be independent of a tag 32. The antenna 36 is positioned on the surface of the core 14 utilizing any known technique, such as printing a conductive ink, sputter coating a conductive material, etching, and hot foil stamping, among other known antenna depositing techniques. Furthermore, RFIC 34 may be coupled to the antenna 36 by leads, connectors, interposers, or other known techniques for coupling an RFIC 34 to an antenna 36.

While the invention has been discussed in the context of rolls of paper, the invention is not limited specifically to paper. Other types of materials may also be wound around the core 14. Moreover, as discussed below, the system of the invention may be utilized with any type of inventory that is transportable by a fork lift truck 18 or similar material handling device. For example, the inventory may include a plurality of cardboard boxes that are filled with a product. An inlet 26 may be positioned on an inner or outer surface of each of the cardboard boxes, positioned on the products themselves, or simply positioned inside the box on a floating inlet.

Figure 11:
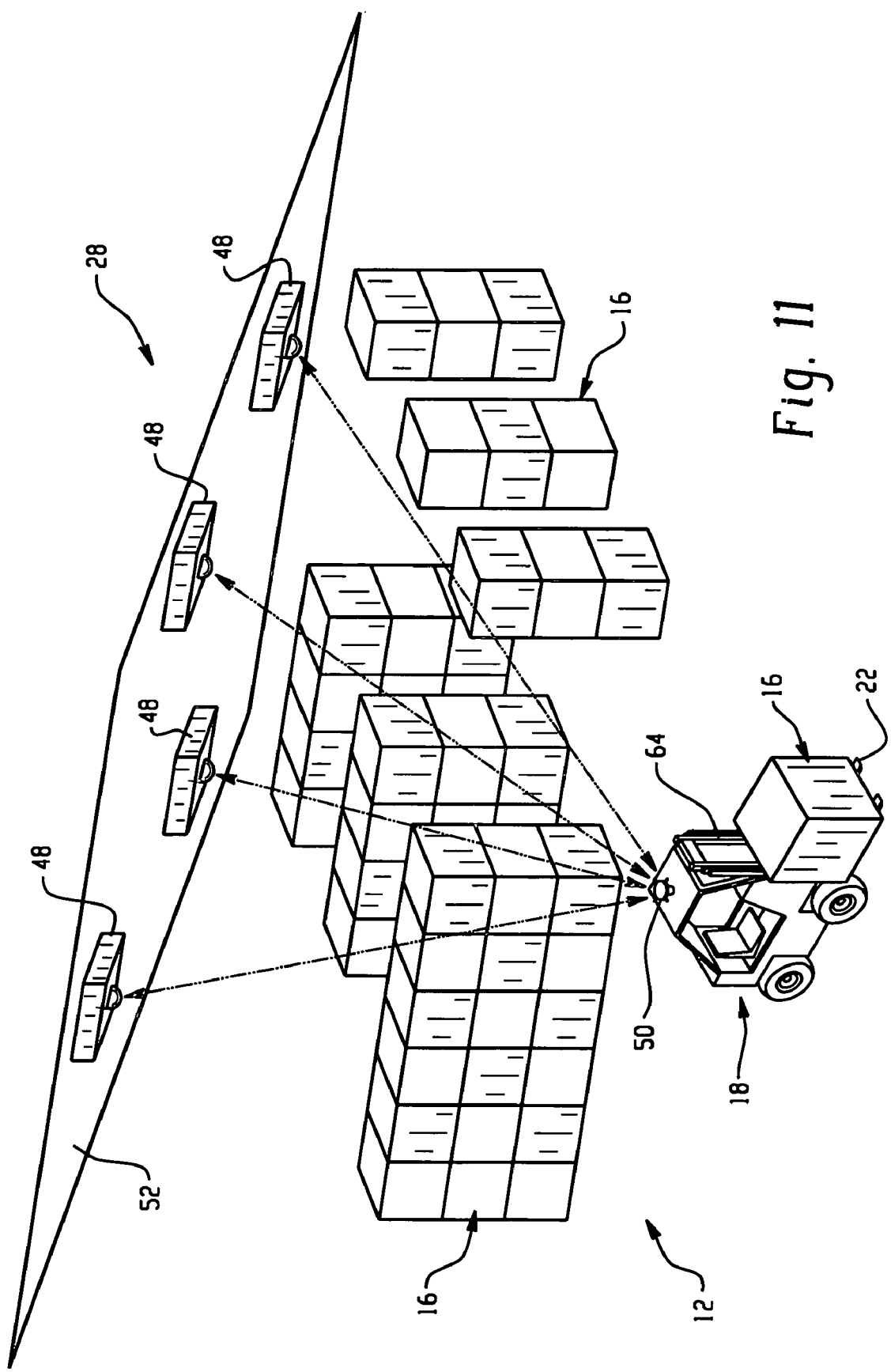
FIG. 11 is a schematic of a fork lift truck in a warehouse in communication with the RFID transmitters.

Material handling devices, such as fork lift trucks 18, are typically used in a warehouse 12 to move inventory 16, which is often stored on pallets. Fork lift trucks 18 include attachments in the form of arms 22 for engaging and moving the pallets, as shown in FIG. 11. The arms 22 may also engage the inventory itself without the need for pallets, depending on the size and shape of the inventory.

One type of fork lift truck 18 is known as a clamp truck. Clamp trucks, such as those shown in FIGS. 5–10, are used to lift heavy rolls of paper. Clamp trucks include large curved arms 22a having clamp pads 22b. The clamp arms wrap around the paper roll 10, lift and transport the paper roll 10, and deposit the roll in either a storage location within the warehouse 12, or on a truck or train for transportation out of the warehouse 12. Since rolls of paper can be costly, it is desirable to electronically track the location of rolls in a warehouse 12.

The present invention tracks the location of rolls of paper by positioning an RFID inlet 26 (i.e., RFID transponder) on the core 14 of each paper roll 10 and installing a reader 20 on the fork lift truck 18 for communication with the RFIC positioned on the RFID inlet 26. A warehouse position locating system 28 tracks the location of each fork lift truck 18 in the warehouse 12. A first computer processor 58 is positioned on the fork lift truck 18 and a second computer processor 30 is positioned in the warehouse 12. Based on the location of the truck in the warehouse, the position of the paper roll 10 is calculated and the position and the paper roll's associated unique ID(s) is communicated from the RFID reader 20 to the second computer processor 30. The second computer processor 30 includes a data processor and the data processor maintains the position information and corresponding unique ID for each item of inventory 16. The second computer 30 may link this information to another site, such as the internet, for offsite monitoring. The system permits automatic, at a distance, non-line of sight communication.

Figure 9:
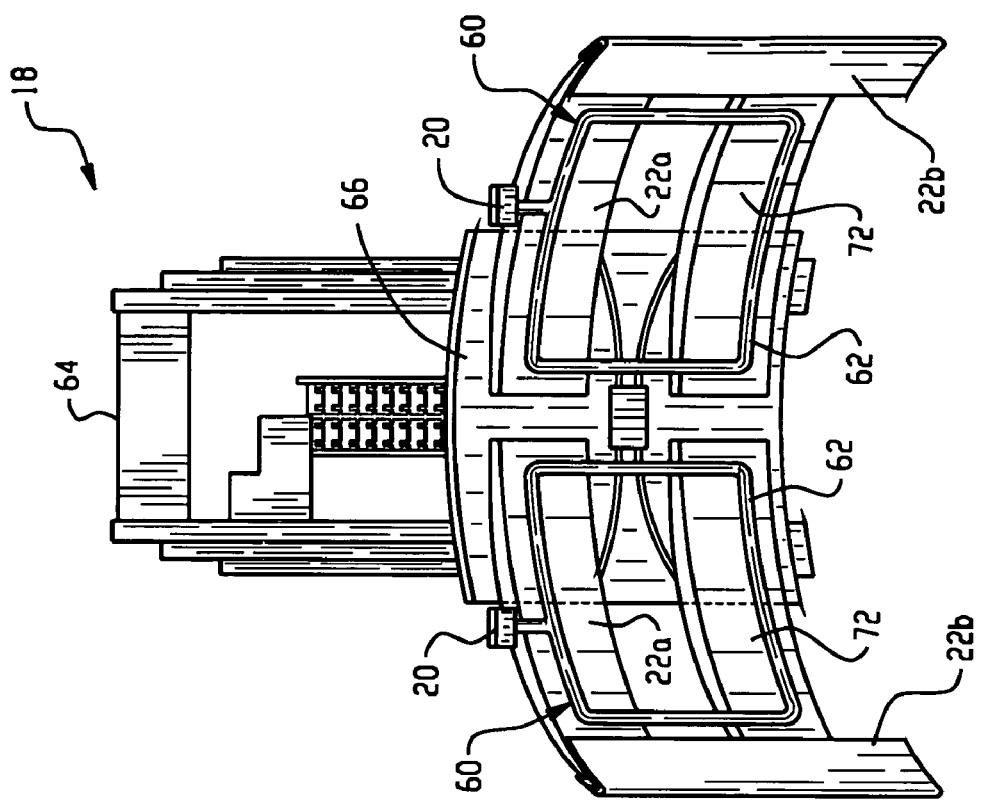
FIG. 9 is a front plan view of a fork lift truck and clamp arms incorporating an antenna embedded in each of the clamp arms, with the RFID readers positioned on the clamp arms.
Figure 10:
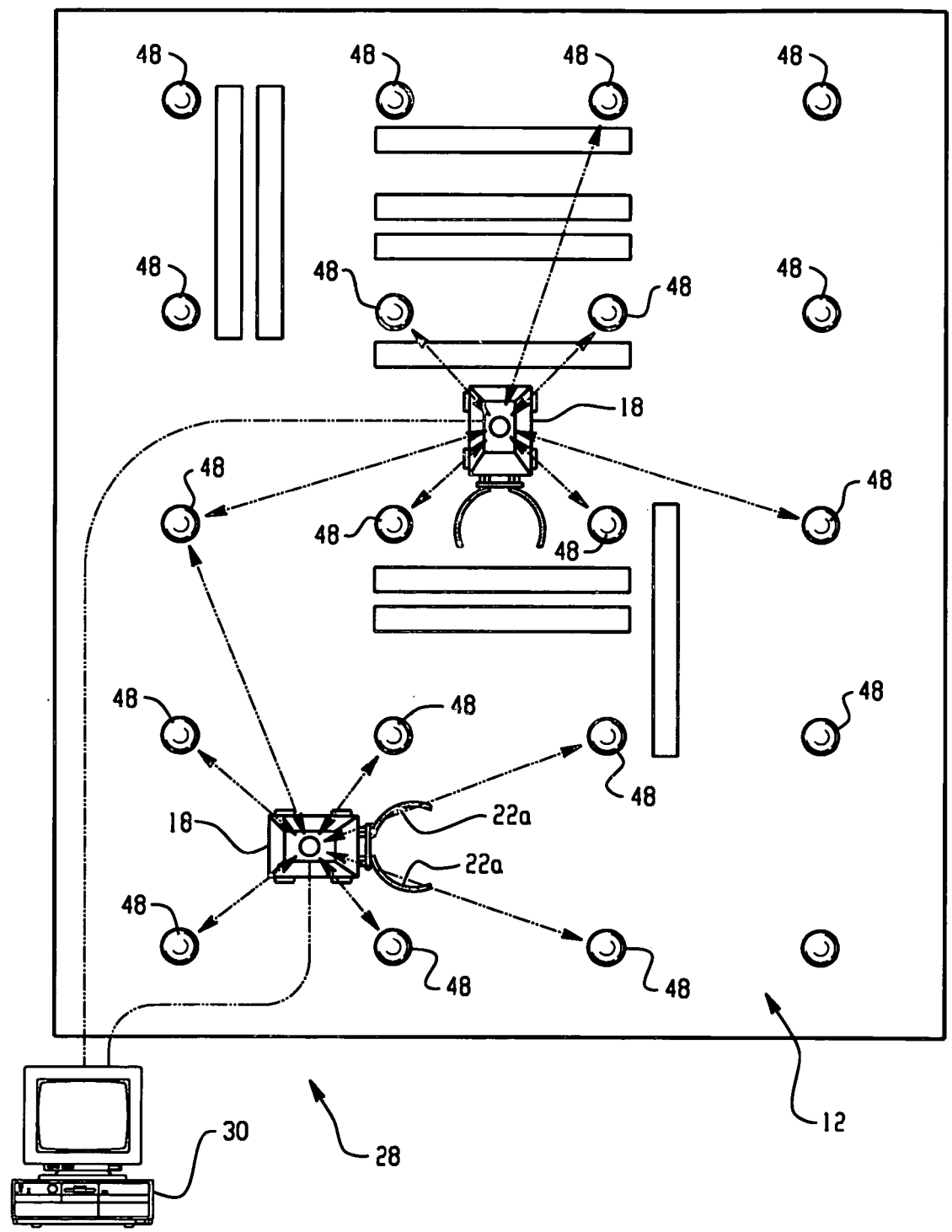
FIG. 10 is a schematic top view of a warehouse having a plurality of RFID transmitters for communicating to several fork lift trucks at the same time in the warehouse.

Referring to FIGS. 5–12, the system of the present design utilizes a fork lift truck 18 as a mobile carrier for an RFID reader 20. The reader 20 is in communication with the second computer processor 30 in the warehouse 12 and the first computer processor 58 that is positioned onboard the fork lift truck 18. The reader 20 is electrically or magnetically coupled to the RFID inlet. The system also utilizes a position locating system 28, which is in communication with the second computer processor 30 and the first computer processor 58. The second computer processor 30 includes a database system for storing of data. The position locating system 28 operates on principles similar to that of the global positioning system ("GPS") and tracks the location of items of inventory 16 in the warehouse 12. One type of position locating system 28 is a positional beam system, which utilizes RFID transmitters 48 and RFID receivers 50 positioned on each fork lift truck 18, as shown in FIGS. 5, 10, and 11. In a preferred embodiment, the RF polling system is a receiver 50 having a spinning or stationary flat planar antenna(e) 54 positioned on top of each fork lift truck 18 and the transmitters are RFID beacons 48 positioned on the ceiling 52 of the warehouse 12. The position locating system 28 may also utilize a truck mounted inertial measurement unit 56 ("IMU"), in combination with distance sensors, or another location measurement device or sensor, which is used to track the location of the truck based upon the truck's movement. The position locating system is comprised of several sub-systems. One subsystem is the Radio Frequency Direction Finding system ("RFDFS"), depicted in FIGS. 10 and 11. The RFDFS includes a plurality of RFID transmitters or beacons and at least one receiver, In one embodiment, the system processes a number of signals received by the receivers 50 from the beacons 48 and measures angular position difference information for a selected number of signals. In a preferred embodiment, the beacon signals are received by each receiver 50, and two of the signals are selected, digitized, and processed by the first onboard computer processor 58. Triangulation and filtering algorithms are stored in the onboard first computer processor 58, as well as tracking algorithms that are utilized to process RFDFS/Location Measurement Device measurements. The algorithms are applied to the signal data in the onboard computer processor 58 to calculate a position of the lift truck 18 in the warehouse 12 and a position of the item of inventory 16. The programming in the first computer processor may also be utilized to calculate a position of a defined reference point in the warehouse.

In operation, the reader 20 communicates with the RFIC 34 in a conventional manner. For example, with a passive RFIC 34, the reader 20 powers the RFIC 34 so that the RFIC 34 communicates information stored in the RFIC 34 to the reader 20. The reader 20 then communicates the information stored in the RFIC 34 to the second computer processor 30. Material identification, manufacture date, customer, and other data are preferably stored in the RFIC. The RFIC 34 may be written to by the reader 20 to store additional information in the RFIC 34, such as material weight. For example, if the paper roll 10 is moved from a first position in the warehouse to a conveyance, information regarding the shipping information may be written to the RFIC. The information may either be written over existing information, or added to existing information stored in the RFIC 34. Information is also updated in the second computer 30 whenever inventory 16 is moved in the warehouse, or removed from the warehouse.

Each reader 20 is preferably associated with a reader antenna 60. In one embodiment, shown in FIG. 5, readers 20 are positioned on the arms 22a of the fork lift truck 18 and a reader antenna 60 is associated with each of the readers 20. The reader antenna 60 is formed by coating each fork lift arm 22a with a conductive material, such as a conductive ink, and coupling the fork lift arms 22a to the reader 20 by an electrical connector (not shown). A reader 20 is coupled to each arm so that the left arm represents an electrical potential that is separate from that of the right arm. When the fork lift arms 22a come into contact with the paper roll, the charge is dissipated through the RFID transponder via the capacitive couple to allow communication between the readers 20 and the RFIC 34 that comes into proximity with the reader 20.

Figure 6:
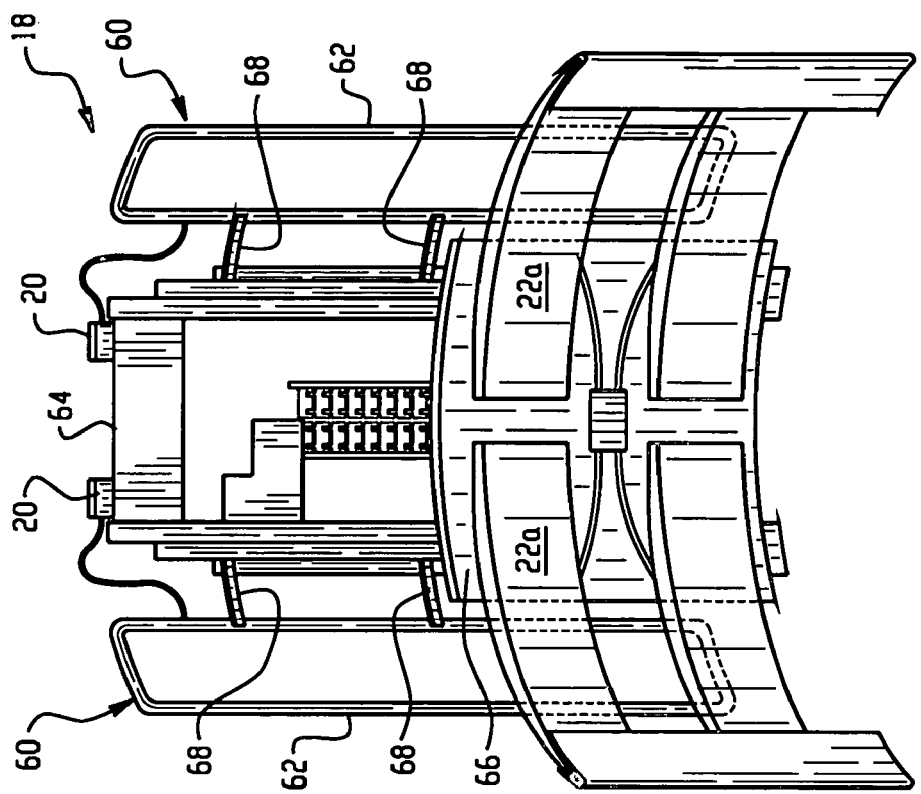
FIG. 6 is a front plan view of a fork lift truck and clamp arms incorporating antennae and RFID readers attached to the fork lift truck.

In another embodiment of the system, as shown in FIGS. 6–9, a reader antenna 60 is positioned in a conductive loop 62 that extends outwardly from the fork lift truck 18 and the reader 20 is positioned on the fork lift truck 18. The reader antenna 60 is electrically coupled to the reader 20 by cables or other connectors. The reader antenna may include a rigid, conductive tube positioned in the shape of a loop 62 with several conductor turns. The loop may include stabilizing members 70 that bisect the loop so that the loop forms a ladder-like configuration, as shown in FIG. 6. The reader antennae 60 may be positioned adjacent each other to form a grid that extends from or is positioned on the fork lift truck 18.

Figure 7:
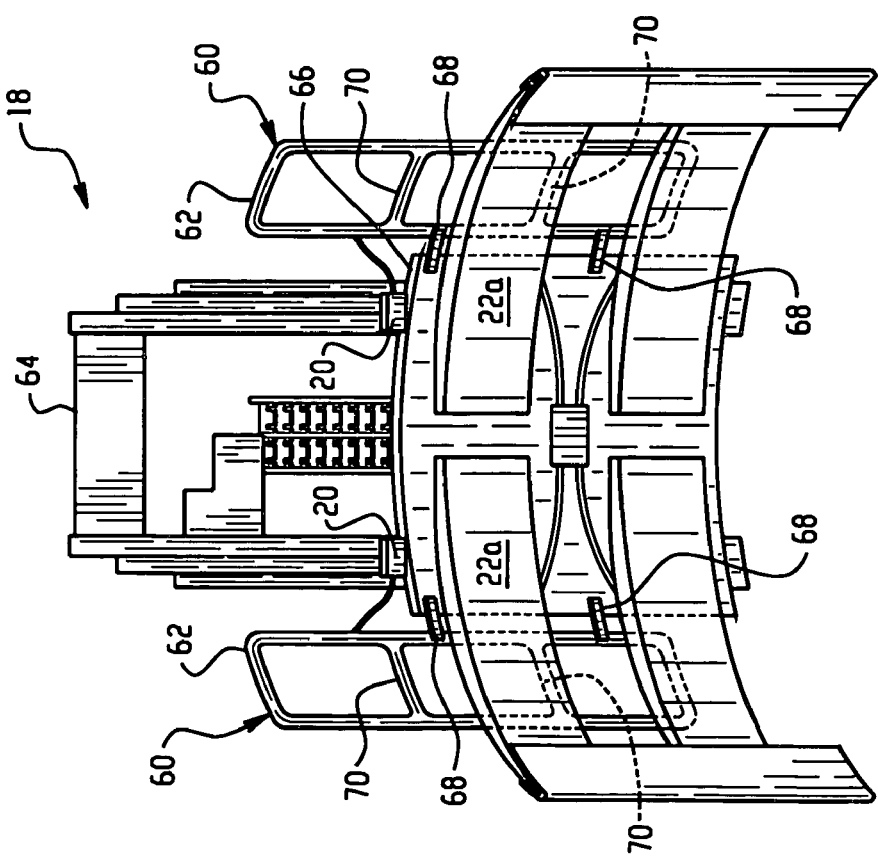
FIG. 7 is a front plan view of a fork lift truck and clamp arms incorporating different antennae and RFID readers attached to the fork lift truck.
Figure 8:
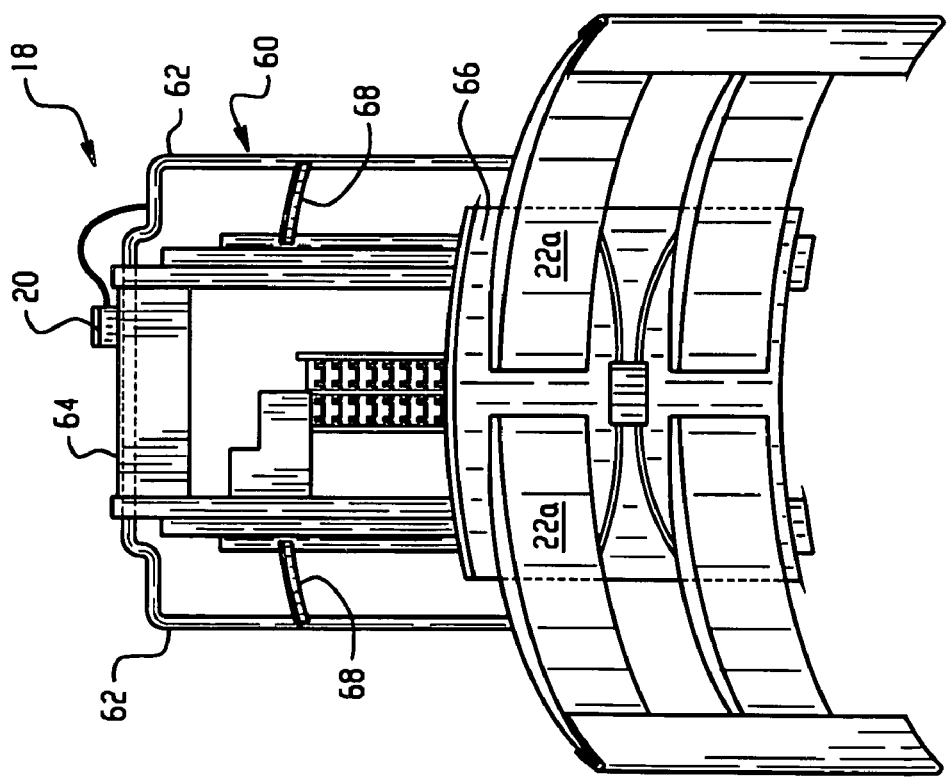
FIG. 8 is a front plan view of a fork lift truck and clamp arms incorporating an antenna and an RFID reader positioned around the lift mast of the fork lift truck.

In other embodiments, the reader antenna 60 forms a loop shape without the need for stabilizing members, as shown in FIGS. 7–9. The tubes of the antenna are preferably formed of a conductive material such as copper or aluminum. A wire transformer is suspended inside the tube and is buffered from the tube walls by a buffering material, such as an insulating dielectric. The wire transformer is in electrical communication with the reader 20 and is preferably connected to the reader by a cable or other connector. The conductive tube of the loop antenna 62 is utilized to protect the antenna's wire transformer and is also used to shield the transformer from electromagnetic noise. The conductive tubes help to shield any electromagnetic noise and drain electromagnetic current to neutral. Other types of antenna configurations and shielding may also be utilized. The antenna is preferably positioned so it does not interfere with the operation of the arms 22, 22a or pads 22b.

FIGS. 6–9 show a variety of locations for the readers 20 and the reader antennae 60. FIG. 6 shows two ladder-like antenna loops, with one of the loops positioned on one side of the lift mast 64 and the other positioned on the other side of the lift mast 64. The loops are attached to the fork lift truck 18 by the back plate 66 with a bracket 68. The back plate 66 is the portion of the fork lift truck 18 where the attachments, such as the clamp arms 22a, are connected. The loops 62 are angled relative to the lift mast 64 in order to approach or obtain 360° RF coverage when an item of inventory is positioned in the arms 22a. The loops are fixed to the back plate 66 by the brackets 68 and do not move when the clamp arms 22a move. In an alternative embodiment, the reader antenna loops 62 move up and down with the movement of the arms 22a. The antenna loops are configured to not interfere with the movement of the clamp arms or the movement of the truck into tight spaces. In this regard, it is desirable that the loops do not extend outside the width of the truck 18. Each reader antenna loop 62 is positioned on the back plate 66 and coupled to the reader 20 by a cable. The reader 20 may range in size depending on the manufacturer, with a typical size being approximately 6"×4"×2". A separate reader 20 is generally provided for each reader antenna loop 62, although a single reader may be used with multiplexed antennae. The reader is powered by the fork lift truck's electrical system, although a separate power system may alternatively be provided, if so desired.

FIG. 7 shows two reader loop antennae 62, positioned on either side of the lift mast 64. The loops are attached to the lift mast 64 by brackets 68, are not movable, and preferably extend the full height of the lift mast 64. Readers 20 are coupled to the loops 62 and are positioned on the lift mast 64. The readers 20 are electrically coupled to the antenna loops 62 by cables or other connectors. The antenna loops of FIG. 7 are similar to the antenna loops of FIG. 6, but do not include the stabilizing members 70. The tubes that form the outer shell of the reader antenna loops 62 are preferably of a size that permits them to be stable and sturdy without the need for stabilizing members 70. For instance, 1" or 2" copper tubing may be utilized to form the tube loops. As with the embodiment of FIG. 6, the loops are fixed in position by the brackets 68 and are preferably angled within the roll constant surface plane of the clamp arms 22a and pads 22b to provide 360° RF read coverage. The loops 62 are preferably spaced from the lift mast 64 by a distance in order to prevent RF field loss between the lift mast 64 and the antenna loops 62. A preferred spacing 2" to 4".

FIG. 8 shows a reader single loop antenna 62 that is positioned around and outlines the lift mast 64. The loop 62 includes tubes and a transformer similar to that discussed above, but is wider than prior embodiments due to the size of the lift mast 64. The reader antenna 60 is preferably spaced from the lift mast 64 by 2" to 4" in order to avoid any RF field loss between the mast 64 and the antenna 60 and is connected to the mast 64 by brackets 68 or other connectors. Depending on the shape and size of the mast, the antenna loop 62 may wrap around the back of the mast 64, as shown in FIG. 8, or may extend over the top and under the bottom of the mast 64. Because of the larger width of the antenna 62 caused by the width of the lift mast 64, effective read ranges are obtained. In this embodiment, the reader 20 is positioned on top of the lift mast 64, although it could be positioned at other locations, such as on the antenna loop 62 or the truck body, among other locations.

FIG. 9 shows an alternative embodiment where the reader antenna loops 62 are recessed into the face 72 of the clamp arms 22a and clamp pads 22b. Two antenna loops 62 are shown, one positioned on each clamp arm 22a. The loops 62 are tubes that are positioned in troughs on the clamp arms 22a and clamp pads 22b, and the readers 20 are positioned on their respective clamp arms 22a. In this embodiment, the loops are recessed below the face 72 of the clamp arms 22a/clamp pads 22b in order to avoid any physical interference between the antenna loops and the inventory being transported. The antenna loops 62 are suspended in an insulating dielectric positioned between the antenna loop and the metal trough. The insulating dielectric prevents the antenna loop from making contact with the metal of the clamp arm 22a/clamp pad 22b in order to avoid any electromagnetic interference or shorting out of the antenna.

In yet another embodiment, the reader antenna loop 62 encompasses the back plate 66. This embodiment is similar to that of FIG. 7, except FIG. 7 shows the loop around the lift mast 64. A clearance of 2" to 4" around the back plate 66 is preferred in order to avoid any RF field loss. In this embodiment, the reader 20 may be positioned on the back plate 66, the arms 22a, 22b the lift mast 64, or the truck body.

The reader antenna loops 62 range in size depending on the size of the fork lift truck 18 and the arms 22, 22a, 22b. In one embodiment, such as those where the loops are positioned on either side of the lift mast 64, the width of the loop ranges from about 12" to about 24", with a preferred width being 20". In embodiments where the reader antenna 60 is positioned around the lift mast 64 or back plate 66, the antenna may be wider, such as about 36". The height of the antenna loop 62 is dependent on the range of coverage desired. For instance, if the lift mast 64 has a lift height of 48", the antenna also preferably has a read height of 48" or more. The antenna 60 will typically provide a read coverage for the entire height of the antenna. Therefore, if a read height of 50" is desired, the antenna should be at least 50" high.

The height and width of the antenna 60 determines the coverage area for reading the RFID inlets 26 positioned on inventory 16. Where numerous items of inventory 16 are positioned in or on the arms of the fork lift truck 18 at one time, such as where a pallet carries boxes of products, the reader 20 will read the RFIC 34 of each item of inventory 16. Thus, the computer will know that the particular item of inventory is on the pallet, but will not be able to determine the precise location of the inventory on the pallet. An alternative antenna/reader configuration may be utilized similar to that shown in FIG. 6, but incorporating a separate antenna loop and reader for each part of the ladder. With the configuration shown in FIG. 6, three separate antenna loops 62 are stacked on top of each other on each side of the lift mast 64 and a total of six readers 20 are positioned on the fork lift truck 18. The readers 20 may be positioned on the clamp arms 22a, the back plate 66, the lift mast 64, the body of the truck, or the antenna loop 62. With this multiple antenna/reader configuration, the reader 20 can be used to determine the location of the RFIC 34 with greater precision than where a larger, single loop is utilized. The first computer processor 58 on the truck 18 utilizes algorithms to more precisely determine the position of the RFIC 34 by cycling the readers 20 and using field of strength measurements, among other methods.

The reader 20 on the fork lift arms 22, 22a can be Motorola's BiStatix, Philips' Icode, or any other reader that meets the electrical requirements of the system. Since the paper on the roll creates losses in the radio frequency signal from the reader 20 and RFIC 34, a lower frequency signal may be required to avoid excessive attenuation losses. Advantageously, when the fork lift truck arms or pads are touching the paper roll 10, the conductive surface of the reader 20 does not have high frequency reflections at the paper interface, which helps to reduce reflected energy losses.

The fork lift reader 20 may be activated automatically or manually. For example, the reader 20 may be manually activated by the fork lift operator by activating a switch when desired to obtain a reading from the RFIC 34 or to write to the RFIC 34. The switch may be positioned in the cab of the fork lift truck 18 and may be engaged by the operator when the clamp arms 22a are in close proximity to an item of inventory 16. The inventory 16 may be in the grasp of the clamp arms 22a or pads 22b, or may be positioned near the clamp arms 22a or clamp pads 22b. In order for the reader 20 to properly interrogate the RFIC 34, it must be close enough to the inventory 16 to obtain a reading. The necessary proximity requirement is driven by the size and type of antenna 36 that is coupled to the RFIC 34 installed on the core 14, the size and type of antenna 60 coupled to the reader 20 on the fork lift arms 22, 22a, the distance and type of material through which the reader 20 and RFIC 34 signal must travel, the location of the reader 20 relative to the RFIC 34, and the existence of any obstructions between the reader 20 and the RFIC 34, among other factors.

The reader 20 may alternatively be automatically activated. For example, the reader 20 may be activated when the clamp arms 22a or pads 22b come in contact with the paper roll 10. A pressure switch may be positioned on the clamp arms or pads and activated when the clamp arms 22a have contacted a roll of paper 10. In another embodiment, switches or sensors are positioned on the clamp arms 22a and activate when the clamp arms 22a or pads 22b are brought to a point towards one another that signals the clamp arms have engaged a roll of paper 10.

In a preferred embodiment, pressure switches are associated with the movement of the clamp arms 22a. The clamp arms 22a typically include hydraulics that move the arms inwardly and outwardly to grasp a roll of paper 10, transport it, and deposit it. In order to grasp a roll of paper 10 and transport it, the clamp arms 22a apply pressure to the roll. Pressure switches are coupled to the movement of the clamp arms 22a in a conventional manner and are sensitive to the pressure being applied by the clamp arms 22a or clamp pads 22b as they grasp a roll of paper 10. When the pressure reaches a predetermined triggering level, the first processor detects and directs the reader 20 to activate and communicate with the RFIC 34. When the clamp arms 22a and clamp pads 22b release the transported roll of paper 10, the pressure level of the clamp arms 22a passes by the triggering level and, once again, the reader 20 communicates with the RFIC 34 and first computer processor 58. In operation, the reader 20 interrogates the RFIC 34 and reads the data stored in the RFIC 34. When the fork lift arms 22a are lowered or opened to release the paper roll 10, the location of the paper roll 10 is determined using the position locating system 28. The position information is transmitted from the first computer processor 58 to the second computer processor 30 for later use. Each time the paper roll 10 is moved, the position information is preferably updated in the second computer processor 30. The position information may be stored even when the paper rolls 10 are loaded into trucks and railway cars for transportation to customers. The position locating system 28 can survey the frontier of the warehouse to determine when a fork lift truck 18 has left the frontier, such as when a truck 18 leaves the warehouse to deposit a roll of paper in a train or truck for transport to the customer. In addition, automatic input into the second computer processor 30 occurs when an item of inventory is removed from the warehouse.

In a preferred embodiment, the position locating system 28 is activated automatically to determine the position of the receivers 50 on the fork lift trucks 18 at appropriate operation periods, such as when the truck 18 is positioning an item of inventory 16 in the warehouse 12. In a preferred embodiment, the RFID receivers 50 are continuously receiving the RFID beacon signals to continually determine the position of the RFID receivers, although other embodiments may use a periodic, rather than a continuous sampling.

The number of RFID beacons 48 needed for the warehouse position locating system 28 will depend upon warehouse size, density of paper rolls, operating frequency, and the number of electromagnetic scattering objects. FIG. 10 shows a warehouse 12 having multiple beacons 48. FIG. 11 shows a warehouse having four beacons 48. The RFID beacon density may be uniform or non-uniform.

The beacons 48 are transmitters that transmit RF signals at a specific frequency, where each beacon transmits a different frequency, such as is known with Frequency Division Multiple Access ("FDMA") Systems. Each frequency is tied to a specific beacon and the receivers can determine which beacon they are receiving signals from based upon the frequency of the signal they receive. Additionally, the second computer's database maps out the location of each beacon. Through triangulation techniques, the receiver location is determined by calculating the angular location of the sensed beacon in relation to the same beacon's absolute location. In a large warehouse, frequencies may be duplicated when transmitters are spaced so far apart that confusion of location is not likely. The beacons 48 are fixed at specific locations so that when an RF signal is received by the receiver 50, the location of the signal can be precisely determined. The spacing of the beacons 48 is determined using known spacing techniques.

The receiver 50 is preferably mounted on the fork lift truck 18 and includes a spinning and/or flat stationary planar antenna(e) for use in continually communicating with the RFID beacons 48. The receiver 50 communicates with all beacons 48 in its relative vicinity and, utilizing tracking algorithms stored in the first computer processor 58, selects several of the signals for processing. The tracking algorithms preferably select the beacons 48 proactively, by seeking out new beacons 48 as the receiver 50 is moved about the warehouse 12. The proactive nature of the tracking algorithm adds to the stability of the system, since the receiver is continually receiving angular measurements from several beacons 48 at a time. The receiver 50 has numerous modules (hardware), some of which include programming for receiving high frequency signals and down converting them to lower frequencies. Other modules include programming for digitizing the signals for use with the algorithms in the first computer processor 58. The modules are stored within the first computer processor housing 58 and spinner assembly housing 54.

A warehouse environment is potentially susceptible to multipath errors due to metal or other structures in the warehouse 12 that reflect the electromagnetic waves emitted by the RFID beacons 48. Multipath errors are caused when a radio signal is received directly by an antenna, but then the same signal is received again as it is reflected off an interfering structure. The use of "Preprocessing" filters minimizes the instability effects that multipath may cause by selectively ignoring beacon multipath measurements. Preprocessing filters can be used on radio signals to filter out any erroneous signals. The signals may then be further refined in a Kalman Filter, which is a known multiple-input software filter that can optimally select or reject, in real time, the sensor inputs based on the quality of the respective sensor measurements. The Kalman filter may reject erroneous sensor inputs to calculate the desired output of the position locating system 28 with the location measurement unit 56, and a Kalman filter provides improved overall navigation accuracy. The Kalman filter may reside in the receiver 50, in the first computer processor 58, or in the second computer processor 30. A preferred location for the Kalman Filter is in the first computer processor 58.

In one embodiment of the system, a location measurement device 56, such as an inertial measurement unit ("IMU"), is positioned on the fork lift truck 18 and used to track the location of the truck 18 in RF "blind" areas. Inertial measurement units 56 are self-contained position measurement devices that monitor position based upon the movement of the vehicle. Distance sensors are preferably coupled to the inertial measurement unit to monitor movement of the truck 18. IMU's may include such features as a lateral accelerometer, a longitudinal accelerometer, a yaw rate gyro, and other devices for determining distance traveled and accurate stop state, among other components. The inertial measurement unit 56 can also be utilized to measure the fork lift trucks heading angle through the use of an electronic compass compared to that of a reference (i.e., true North) for use in calculating the position of the truck. The unit 56 makes calculations of the position of the receiver 50 based upon the movement of the vehicle and maintains a stable calculation up to about 12 seconds. It works in concert with the RFDFS 28, which updates the "absolute" position of the receiver 50 based upon measurements taken from the beacons 48 through the receiver 50. The inertial measurement unit 56 and distance sensors update the Kalman filter during time periods between Kalman filter updates by the RFDFS 28. In this way, the Kalman filter output is stable during movements and the system continually has position information.

Other types of devices and/or sensors, or combinations of sensors and devices, may also be used as the location measurement unit 57 instead of the IMU. For example, position information can be determined by using distance sensors, which are typically coupled to the wheels of the truck and are used to determine distance traveled based upon rotation of the wheels, in combination with an electric compass, which is used to establish heading. A combination of these two devices are used to determine the position of the truck between updates from the position locating system. Other devices, besides those described above, may also be utilized to determine the position of the truck between updates. The term "location measurement device" is used herein to describe either a typical inertial measurement unit or other types of devices. The purpose of the location measurement device is to determine the location of the truck between communications with the position locating system.

Referring to FIGS. 10 and 11, the position of the receiver 50 in the warehouse 12 is determined through triangulation calculations of known RFID beacon locations in the warehouse 12. Algorithms utilized to perform the position calculations are stored in the first onboard processor 58. The second computer processor 30 is generally utilized for storing inventory data and for handling communications to the lift truck 18 drivers. In order to avoid overloading the second computer processor 30 with the numerous calculations necessary to determine the position of the receiver 50, these calculations are preferably performed on the first onboard computer processor 58. The necessary algorithms for determining the position of the lift truck 18 in the warehouse 12 are preferably stored in the first computer processor 58. These algorithms, for example, take the signals received from all the beacons 48 in relative proximity to the truck 18 and perform a triangulation calculation to determine the position. In a preferred embodiment, two of the beacons 48 are utilized to perform the triangulation calculation. Therefore, two signals are selected from the numerous signals received by the first onboard processor 58. The triangulation technique measures the angular position of the spinner when the known beacon position is read.

The first onboard computer processor 58 is utilized to resolve errors from the calculations to improve the accuracy of the calculated position information. Algorithms are utilized to resolve errors that are inherent in the system such as multipath, partial blockage, or other errors, as known by those of skill in the art. As previously discussed, one algorithm that may be used to correct for any erroneous measurements in the position calculation is a Kalman Filter. The first computer processor 58 also includes algorithms for use in calculating the position of the item of inventory 16 based upon the calculated position of the lift truck 18.

When the item of inventory 16 is a paper roll 10, the algorithms stored in the first computer processor use an x-y offset to determine where the center of the core 14 is based on the size of the paper roll and the orientation of the truck 18. An algorithm may also be utilized to determine the height at which the paper roll is positioned to account for stacking of the paper rolls 10. In this regard, the fork lift truck 18 preferably includes a device for determining the deposit height of the roll. In a preferred embodiment, the core center location is the position information transmitted to the RFIC 34 and second computer processor 30.

In operation, the receiver 50 on the fork lift truck 18 first runs an initial sweep of all the beacons 48 in the immediate vicinity of the truck 18 to determine an initial position of the truck 18. Paper roll position information is also transmitted to the second computer processor 30 whenever inventory is moved. The position locating system 28 stores the position of each roll, with an accuracy of approximately ±1 foot. The second computer processor 30 can provide an immediate warning when inventory is improperly positioned in the warehouse 12, and can proactively suggest the proper material placement position. In addition, the second computer processor 30 can provide independent verification of shipment contents, interface with all warehouse tracking system software packages, provide inventory reports if so desired, and may be linked to the internet.

In addition to positioning readers 20 on the clamp trucks 18, the system may be expanded to also include readers positioned at other places within the manufacturing and transportation system, such as on paper machine rewinders and process points, as well as on trucks or train cars, the invention not being limited to placement of readers 20 on fork lift trucks 18 alone. In addition, the receivers 50 may be positioned as stationary receivers at points within the warehouse 12 to provide a type of Differential GPS system, as known by those of skill in the art.

In an alternative embodiment of the system, the fork lift truck 18 includes the beacon transmitter 48 and receivers 50 are positioned throughout the warehouse 12. In either case, the captured positional data will be processed by the first computer processor 58 and the unique information on the RFIC 34 on each item of inventory 16 will be sent to the second computer processor 30 for processing and distribution.

The position locating system 28 has been discussed herein in the context of a pseudo-GPS type system. Those of skill in the art will recognize that variations and improvements may be incorporated in the present disclosure to improve the operation of the system, according to currently existing knowledge in the art. The brief description of the position locating system discussed herein illustrates several of many possible embodiments. Furthermore, the invention is not limited to the particular position locating system described herein. Other types of position locating systems may also be utilized, including those that are not based upon GPS principles.

Figure 12:
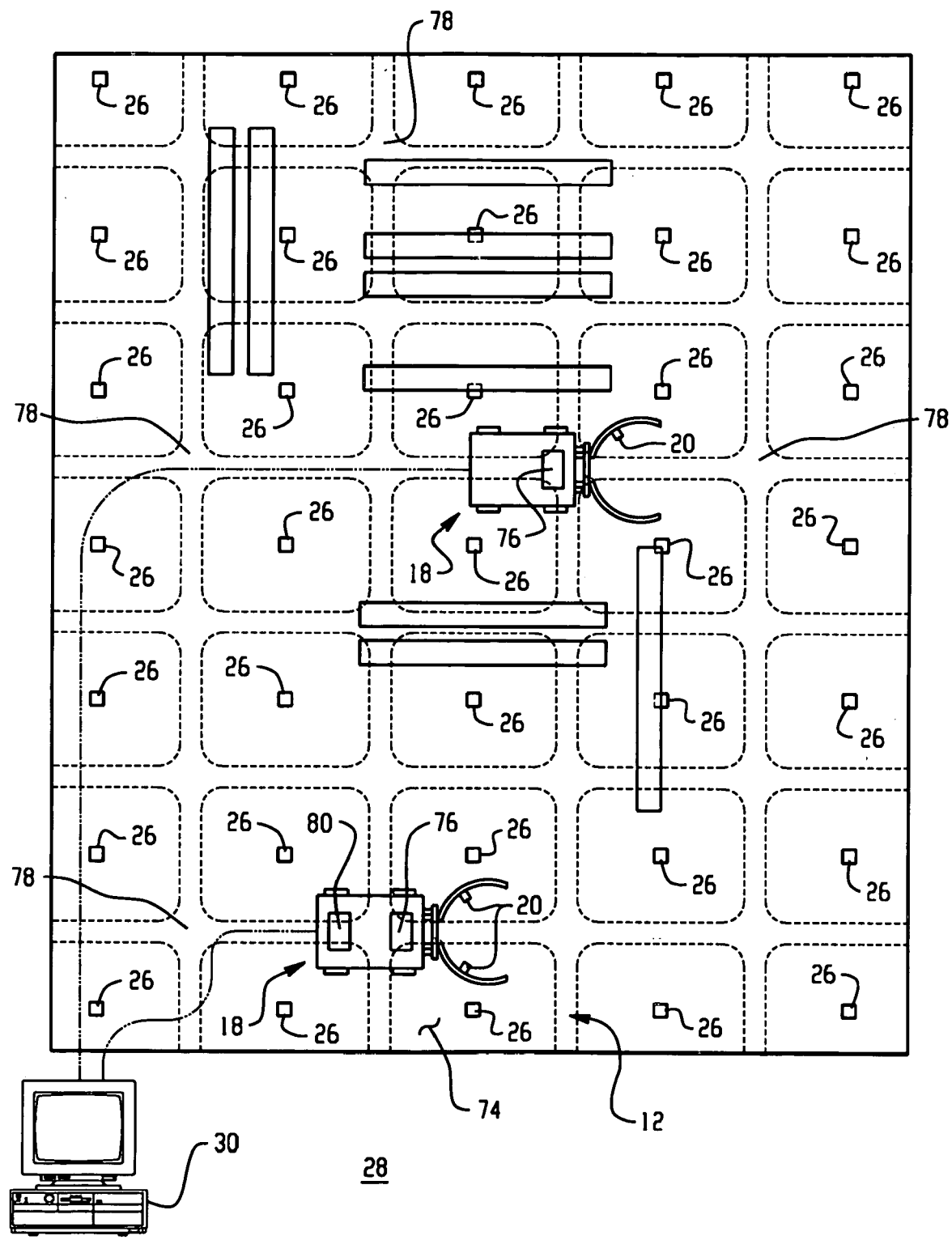
FIG. 12 is a schematic top view of an alternative embodiment of a warehouse having a plurality of RFID inlets installed in a grid pattern in the floor of the warehouse.

For example, in yet another embodiment of the system, the RFDFS system (including the beacons and receivers) may be entirely replaced by a position locating system that includes RFIC's and their associated antennae installed in or on the floor 74 of the warehouse 12. The RFIC's are preferably passive and are powered by an external reader. As shown in FIG. 12, a plurality of RFID inlets 26 are installed in the floor 74 of the warehouse 12 in a regular grid pattern. The position of each RFIC on each inlet 26 within the grid is known since the inlets 26 are fixed positionally on the floor 74. The inlets 26 may be positioned on top of the floor 74, or, in a preferred embodiment, are embedded in the floor 74 and covered by a protective material, such as a laminate.

The RFID inlets 26 replace the beacons 48 discussed above in connection with FIGS. 10 and 11. A reader or readers positioned on the truck 18 replace the receivers 50. In one embodiment of the alternative system, a single additional reader 76 is installed on the truck 18 and is positioned for communicating with the RFIC's installed in the floor 74. The reader has an antenna 60 and the inlet 26 have antennae 36. The reader antenna 60 and inlet antennae 36 are configured to provide a limited read distance such that dead bands 78 are found on the floor 74. In the dead bands, the reader 76 loses communication with the inlets 26.

The dead bands 78 are utilized to avoid readings from two inlets 26 at a single time. The dead bands 78 are configured such that only one RFID inlet 26 is readable at a single time by the reader 76. During times in which the reader 76 is positioned in a dead band 78, the IMU 56, or location measurement unit, may be utilized to supplement position information, as discussed above. Position information can be calculated by the onboard computer 58 and transmitted to the base station computer processor 30 via wireless means.

In another embodiment of this alternative system, two or more additional readers 76, 80 are positioned on the forklift truck 18 at spaced locations from each other. For instance, one reader 76 is positioned at the front of the truck 18 and the other 80 is positioned at the rear of the truck 18. The multiple readers can be used together to triangulate a position of the truck 18. When one of the readers is in a dead band 78, the other reader 80, which is preferably not positioned in a dead band 78, can continue to determine the position of the truck 18 until the other reader 76 reestablishes contact with an inlet 26. With multiple readers 76, 80, the readers can actually replace the IMU 56 and its associated sensors so that the position of the truck 18 can be determined in a less mechanically complicated manner. Alternatively, instead of using multiple readers 76, 80, a single reader could be utilized that has multiple antennae positioned around the truck body. The reader can multiplex through the multiple antennae to obtain readings from nearby inlets 26. The multiple readings can be used to triangulate a position of the truck 18. Two or more antennae can be positioned around the truck. Since readings can be performed in a continuous manner, the IMU can be eliminated.

Readings performed by the readers 76, 80 are preferably continuous, but may be intermittent. In addition, the inlets 26 may alternatively be powered to provide a longer read range, if desired. Dead bands 78 may be sized so that they are smaller in width and length than a typical fork lift truck 18 in order to minimize the likelihood that two or more of the antennae will be positioned in a dead band 78 at a single time.

The systems described above provide a number of benefits in real time, including the ability to track the location of inventory, improve warehouse utilization by mapping the warehouse, improve the placement of inventory utilizing an alarm system, provide independent shipment verification, and provide an electronic physical inventory.

A reader and reader antenna similar to that depicted in FIG. 6 were tested and achieved full read/write capability through a base stock roll of paper that was 75 inches thick. In addition, full mast height read coverage was attained with the antenna design so that the reader 20 could read all stacked rows of paper.

In the preferred embodiments discussed herein, the RFIC 34 is passive. However, a semi-passive or active system is also contemplated for use with the present design. If a semi-passive or active RFIC is utilized, a battery is coupled to the RFIC. In addition, a sensor may be electrically coupled to the RFIC for communication with the RFIC, such as a MEMS (micro electromechanical system) sensor. The sensor may be used to read environmental or other conditions, including physical and chemical properties, in the vicinity of the sensor. Examples of environmental properties include temperature, pressure, and humidity, among other conditions. Multiple sensors may be utilized with a single or multiple RFICs.

The sensors can transmit a sensed condition to the RFIC when commanded to do so. In this regard, the RFIC may be passive, semi-passive, or active. When the RFIC is passive, the reader powers the RFIC and the RFIC then takes a reading of the condition with the sensor. The sensed condition is then transmitted back to the reader. When the RFIC is active or semi-passive, it is battery powered such that the RFIC and a clock on the RFIC are continually powered. The battery powered RFIC can independently signal the sensor periodically to sense a condition and the sensed condition is transmitted to the RFIC for storage in a log or immediate transmission to a reader. Certain types of sensors also require battery power and the power needed by the sensor may be provided by the same battery that is utilized to power the RFIC.

The sensor can be built directly into the RFIC or connected to the RFIC by a connector. Alternatively, the sensor can operate by wireless signal transfer, so that a physical link between the sensor and RFIC is not required. The sensor and battery may be positioned on the substrate of the tag, or may be positioned independently of the substrate and electrically coupled to the RFIC. One type of passive sensor that may be utilized, for example, to read a temperature is manufactured by SCS of San Diego, Calif. A type of active sensor that may be utilized, for example, to record temperature data is manufactured by KSW of Germany. Other types of sensors may also be utilized.

A variety of commercially available tags, inlets, and radio frequency integrated circuits are contemplated for use with the claimed invention. For example, tag suppliers include Poly Flex Circuits, Cross Technologies, and Global ID. RFIC suppliers include Philips Semiconductor, Temic, and E. M. The preferred tags are low profile in order to avoid marking the paper on the roll.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are examples of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A system for reading an RFIC associated with an item of inventory in a warehouse comprising:
   at least one material handling device having at least one member for use in transporting an item of inventory, said item of inventory having an RFIC associated therewith;
   at least one RFID reader coupled to the at least one material handling device for reading the RFIC associated with the item of inventory when the item of inventory is in proximity to the at least one material handling device;
   a computer processor in communication with the at least one RFID reader for receiving information from the RFID reader and transmitting information to the RFID reader;
   a position locating system for determining the position of the item of inventory in the warehouse, said position locating system for transmitting information to the at least one RFID reader and the computer processor, the position locating system comprising a plurality of RFID transmitters and at least one RFID receiver, the at least one RFID receiver is positioned on the at least one material handling device and the plurality of RFID transmitters are positioned at spaced locations throughout the warehouse, the computer processor includes programming for receiving and processing the signals transmitted by the plurality of RFID transmitters and received by the at least one RFID receiver and the programming is for calculating a position of the at least one RFID receiver on the at least one material handling device in the warehouse, the computer processor further includes a first computer processor positioned on the at least one material handling device and a second computer processor positioned in the warehouse, with the first computer processor including the programming for determining the position of the at least one RFID receiver on the at least one material handling device within the warehouse based upon the received and processed signals; and
   a location measurement device mounted on the at least one material handling device for determining the position of the at least one material handling device based upon the movement of the device, the first computer processor receives signals from the location measurement device, the position locating system, the at least one RFID reader, and the RFIC and the second computer processor includes programming for determining the position of the item of inventory and includes a database for storage of the position of the item of inventory, wherein the location measurement device determines the angle of the at least one RFID receiver relative to each of the plurality of RFID transmitters and the programming in the first computer processor is for calculating the position of the at least one RFID receiver and includes triangulation calculations that are in part dependent on the angle of the at least one RFID receiver relative to each of the plurality of RFID transmitters; and further comprising programming for correcting errors in the calculation.

* * * * *